Sept. 19, 1933.     M. BIRKIGT     1,927,768
PISTON ROD ASSEMBLY
Filed June 10, 1929     2 Sheets-Sheet 1
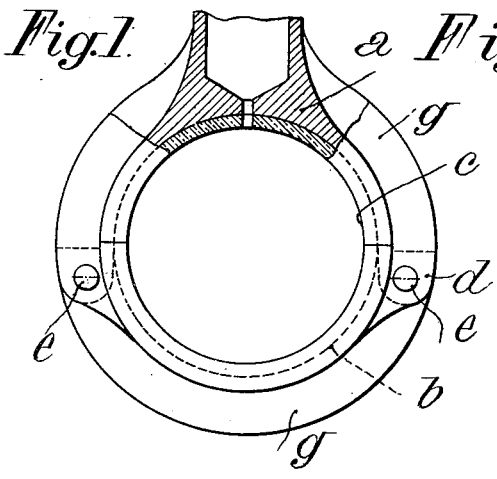
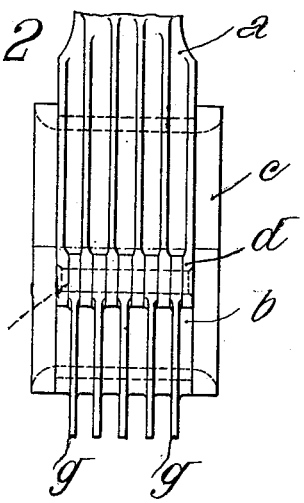
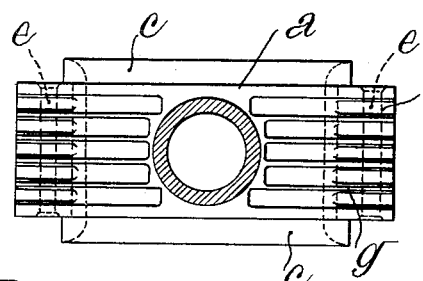
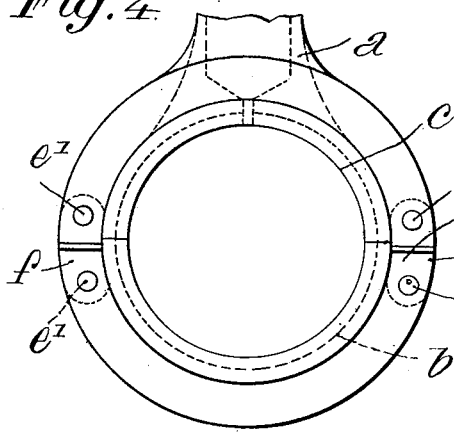
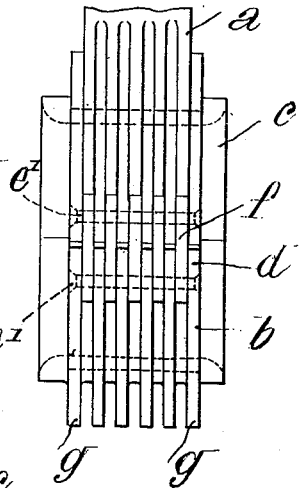
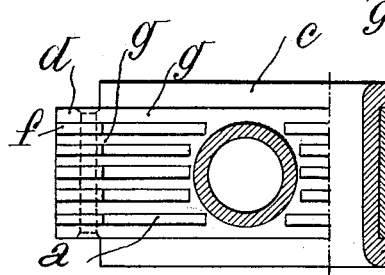
Inventor:
Marc Birkigt,
Atty.

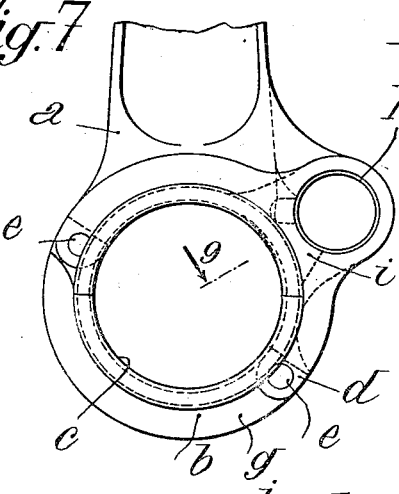
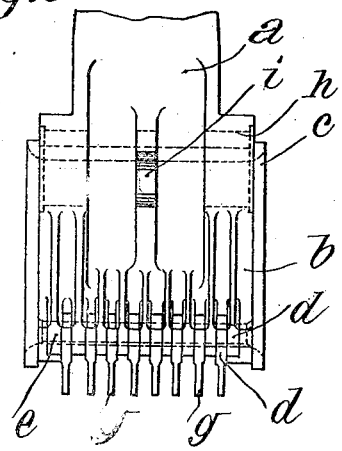
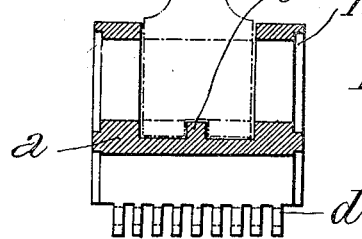
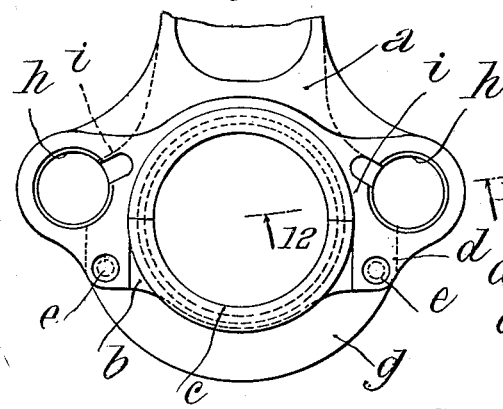
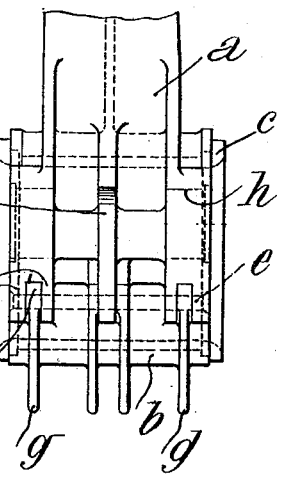
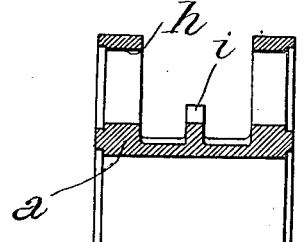

Patented Sept. 19, 1933

1,927,768

UNITED STATES PATENT OFFICE 1,927,768

PISTON ROD ASSEMBLY

Marc Birkigt, Bois-Colombes, France

Application June 10, 1929, Serial No. 369,746, and in Belgium March 11, 1929

2 Claims. (Cl. 308—77)

The present invention relates to piston-rod assemblies and, more particularly, to those of the type commonly used in internal combustion engines.

One of the objects of the invention is to provide means for lightening and strengthening that part of a piston (connecting) rod embracing the crank-shaft.

Another object is to provide a piston rod designed to be easily cooled.

A further object is to provide a bearing for piston-rods of the kind used in V-type motors designed to eliminate certain flexional effects hitherto inherent therein.

Still further objects will appear in the course of the detailed description now to be given with reference to the accompanying drawings, in which:—

Fig. 1 is a front view, partially in section, of one form of connecting rod constructed in accordance with the invention;

Fig. 2 is a side view of the structure represented in Fig. 1;

Fig. 3 is a top-view, partially in section of the same connecting rod;

Figs. 4, 5, 6 represent in a manner similar to Figs. 1, 2 and 3, respectively, a second form of connecting rod;

Figs. 7 and 8 show a connecting rod adapted for use in a V-type motor;

Fig. 9 is a section taken on line 9—9 of Fig. 7;

Figs. 10 and 11 illustrate the invention applied to a connecting rod for a W-type motor;

Fig. 12 is a section taken on line 12—12 of Fig. 10.

Referring to Figs. 1 to 3 of the drawings, there is shown a connecting rod having a tubular stem, and a split head $a$, $b$ carrying a cushion or split collar $c$. Elements $a$, $b$ are provided with fins or ribs $g$ either integral therewith or composed of a good heat conducting metal soldered, brazed, cast or welded thereon. These ribs may be for convenience formed as extensions of the ears, that is, in the same vertical planes as the ears. The essential novelty in this form of connecting rod is the manner in which elements $a$ and $b$ are held together. Whereas it is general practice to employ bolts and nuts working under tension to hold the two halves of the connecting-rod head together, in the form of assembly shown in Figs. 1 to 3, this result is obtained by forming a series of interfitting ears $d$ on elements $a$ and $b$ and passing a rod, pin, rivet or bolt $e$ through a bore formed in said ears. The advantages in this form of construction are (1) elimination of the heavy bosses against which the bolt and nut, hitherto used take up (2) replacement of the comparatively heavy bolt and nut working under tension by a light pin subjected to a shearing strain (3) security against loosening, it being practically impossible for pin $e$ to release elements $a$, $b$. The assembly is found to lessen the weight of the motor (importance in aeroplanes and the like) and increase the strength and security of the joint between the connecting-rod head halves.

The form of structure shown in Figs. 4 to 6 differs from that already described only in the manner in which halves $a$ and $b$ are joined. Here links $f$, having orifices therein aligning with openings formed in ears $d$ which, in this form of assembly do not overlap or interfit, are traversed by pins $e^1$, $e^1$ subjected to a shearing strain.

The connecting rod shown in Figs. 7 to 9 includes a first bearing $c$ for the main crank shaft and a second bearing $h$ adapted to receive a pin maintaining the head of an auxiliary connecting rod (V-type motor). The general assembly $a$, $b$, $c$, $d$, $e$ corresponds to that shown in Fig. 1 (but may, of course, be of the type shown in Fig. 4), the novelty consisting in the design of bearing $h$, which is provided with an intermediate supporting portion $i$ on the thrust side of the bearing adapted to correct the minute flexional effects exerted on the pin supported in bearing $h$. The auxiliary connecting rod is, in such a case, provided with an opening permitting contact of surface $h$ with the pin.

The structure shown in Figs. 10 to 12 merely shows the disposition of intermediate supports $i$ in a connecting-rod head adapted to be used in a W-type motor.

What I claim is:—

1. A connecting rod for internal combustion engines, comprising a rod, a head portion on said rod formed in a plurality of parts and having a cylindrical opening therein adapted to receive a shaft, each of said plurality of parts limiting different angular portions of said cylindrical opening, and means for holding said parts together including link members between said parts and pins positioned substantially parallel to the axis of said opening, said pins engaging the links with the parts.

2. A connecting rod for internal combustion engines comprising a head portion formed in a plurality of parts and having a cylindrical opening therein adapted to receive a crank shaft, each of said parts having at each side a plurality of overlapping interlocking portions extending continuously for a substantial distance along the axial length of the bearing and having aligned openings to form passages therethrough substantially parallel to the axis of said cylindrical opening, each of said plurality of parts limiting different angular portions of said cylindrical opening, and a pin traversing each of said passages, said pins being parallel.

MARC BIRKIGT.